US007101176B1

(12) United States Patent
Capps

(10) Patent No.: US 7,101,176 B1
(45) Date of Patent: *Sep. 5, 2006

(54) ROTARY FLOAT WITH FRICTION-ENGAGED CAP

(76) Inventor: R. Scott Capps, 4804 W. Birch Rd., Clatonia, NE (US) 68328

( * ) Notice: Subject to any disclaimer, the term of this patent is extended or adjusted under 35 U.S.C. 154(b) by 0 days.

This patent is subject to a terminal disclaimer.

(21) Appl. No.: 11/243,833

(22) Filed: Oct. 5, 2005

Related U.S. Application Data

(63) Continuation of application No. 10/689,248, filed on Oct. 20, 2003, now Pat. No. 7,029,274.

(51) Int. Cl.
*A61D 5/00* (2006.01)
*A61C 1/16* (2006.01)
*A61C 3/06* (2006.01)

(52) U.S. Cl. .......................................... 433/1; 433/116

(58) Field of Classification Search .................... 433/1, 433/125, 130, 134, 165–166, 116; 451/451–457; 30/27, 77; 606/180; 83/478; 401/98, 124, 401/202, 243, 262
See application file for complete search history.

(56) References Cited

U.S. PATENT DOCUMENTS

| | | | | |
|---|---|---|---|---|
| 219,849 | A | | 9/1879 | Cushing |
| 374,286 | A | | 12/1887 | Bell et al. |
| 383,367 | A | * | 5/1888 | Patrick ....................... 433/116 |
| 756,836 | A | | 4/1904 | Crawford |
| 854,955 | A | | 5/1907 | Martin |
| 1,035,239 | A | | 8/1912 | Rosenthal |
| 1,170,524 | A | | 12/1916 | Fernald |
| 1,688,136 | A | | 10/1928 | Chayes |
| 4,722,685 | A | | 2/1988 | de Estrada |
| 6,273,712 | B1 | | 8/2001 | Rach et al. |

FOREIGN PATENT DOCUMENTS

| | | |
|---|---|---|
| GB | 838501 | 6/1960 |

* cited by examiner

*Primary Examiner*—John J Wilson

(57) ABSTRACT

A rotary float includes an elongated tubular arm with a drive shaft rotatably mounted therethrough. The forward end of the drive shaft is connected to a collet shaft within an extension tube, and transmits rotational force from the drive shaft to the collet shaft. A bit is mounted on the forward end of the collet shaft, for grinding a surface adjacent the forward end of the extension tube. A cap with an opening therein, is frictionally engaged on the extension tube over the bit, to permit floating of an animal's teeth through the opening, while protecting the animal from the remainder of the bit.

3 Claims, 4 Drawing Sheets

ROTARY FLOAT WITH FRICTION-ENGAGED CAP

CROSS-REFERENCES TO RELATED APPLICATIONS

This is a Continuation of Ser. No. 10/689,248, filed Oct. 20, 2003 now U.S. Pat. No. 7,029,271.

STATEMENT AS TO RIGHTS TO INVENTIONS MADE UNDER FEDERALLY SPONSORED RESEARCH AND DEVELOPMENT (Not applicable)

INCORPORATION-BY-REFERENCE OF MATERIAL SUBMITTED ON A COMPACT DISC (Not applicable)

BACKGROUND OF THE INVENTION (1) Field of the Invention

The present invention relates generally to an equine dental files or floats, and more particularly to an improved float with rotating and pivotable head.

(2) Description of Related Art Including Information Disclosed under 37 CFR 1.97, 1.98

The teeth of a horse are continuously erupting as they wear, and it is typically necessary to periodically file projecting edges of the teeth, to maintain good equine health. Without such "floating," the horses' teeth will develop sharp edges, points and hooks that can lacerate the horse's cheeks and tongue.

The instrument utilized to file the teeth of a horse is commonly referred to as a "float". The conventional float has a head with carbide grit, similar to sandpaper. The size of the grit will determine the coarseness of the float head, and the speed with which the tooth will be ground down to proper shape.

One common problem with prior art equine floats was the length of time that the float head would retain sufficient grit for effective floating. As with sandpaper, the grit eventually wears off of the float head until the file must be replaced or rebuilt. This problem was addressed by the inventor herein in U.S. Pat. No. 5,533,894, wherein a float was provided with a series of cutting teeth on separate faces of a cutting head. When one face became worm, the head was turned to a new face, and floating could continue.

While the float with multiple cutting edges was a successful improvement, it is still a problem to reach various portions of a horse's mouth, for effecting floating. The rigid handle of typical floats hinders the ability of the technician to effectively and conveniently reach all of the teeth in a horse's mouth.

BRIEF SUMMARY OF THE INVENTION

It is therefore a general object of the present invention to provide an improved equine dental float.

A further object of the present invention is to provide an equine dental float with a rotary head.

These and other objects will be apparent to those skilled in the art.

The rotary float of the present invention includes an elongated tubular arm with a drive shaft rotatably mounted therethrough. A drive unit is coupled to a rearward end of the shaft to rotate the shaft. A swivel on the forward end of the drive shaft connects the drive shaft to a collet shaft within an extension tube, and transmits rotational force from the drive shaft to the collet shaft. A bit is mounted on the forward end of the collet shaft, for grinding a surface adjacent the forward end of the extension tube. A cap is frictionally engaged over the bit, with an opening permitting the floating of an animal's teeth, while preventing contact with the remainder of the bit.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
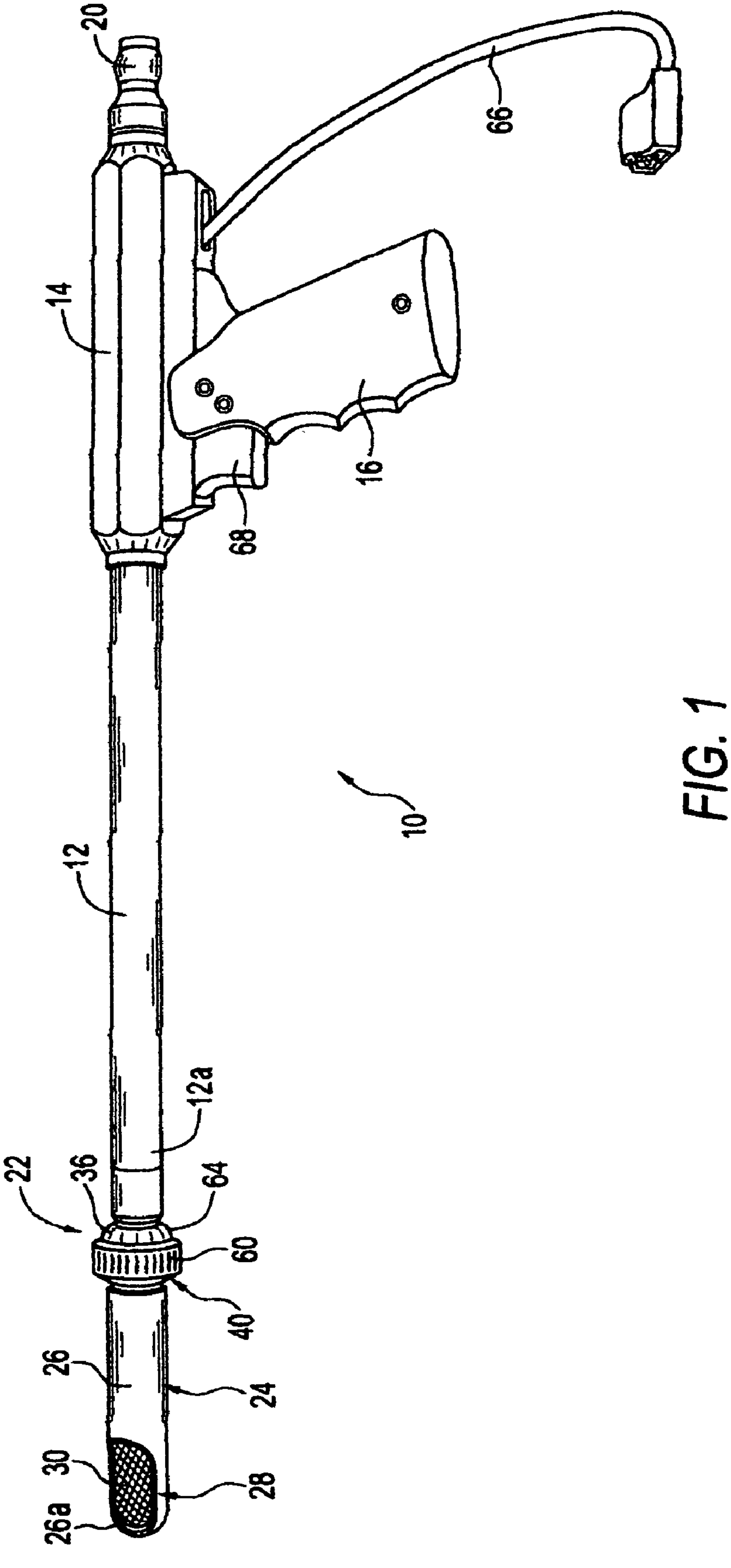
FIG. 1 is a perspective view of a rotary float of the present invention.

Referring now to the drawings, in which similar or corresponding parts are identified with the same reference numeral, and more particularly to FIG. 1, the rotary float of the present invention is designated generally at 10, and includes an elongated arm 12 extending forwardly through a support housing 14. A pistol-grip type handle 16 is attached to housing 14, to provide a convenient location for holding float 10. A rotatable shaft 18 (shown in FIGS. 2 and 4) extends through arm 12, and has a connector 20 on the rearward end thereof. Connector 20 permits connection of drive shaft 18 to a rotary tool, which will cause the selective rotation of drive shaft 18 in arm 12.

The forward end **12*a* of arm 12 has a knuckle 22, which permits the pivotal movement of an extension 24, connected to the forward end of arm 12. Extension 24 has a removable cap 26 with an opening 28 formed in one side proximal the forward end 26*a*, to thereby expose a grinding bit 30 mounted on the forward end of shaft 18**.

Figure 2:
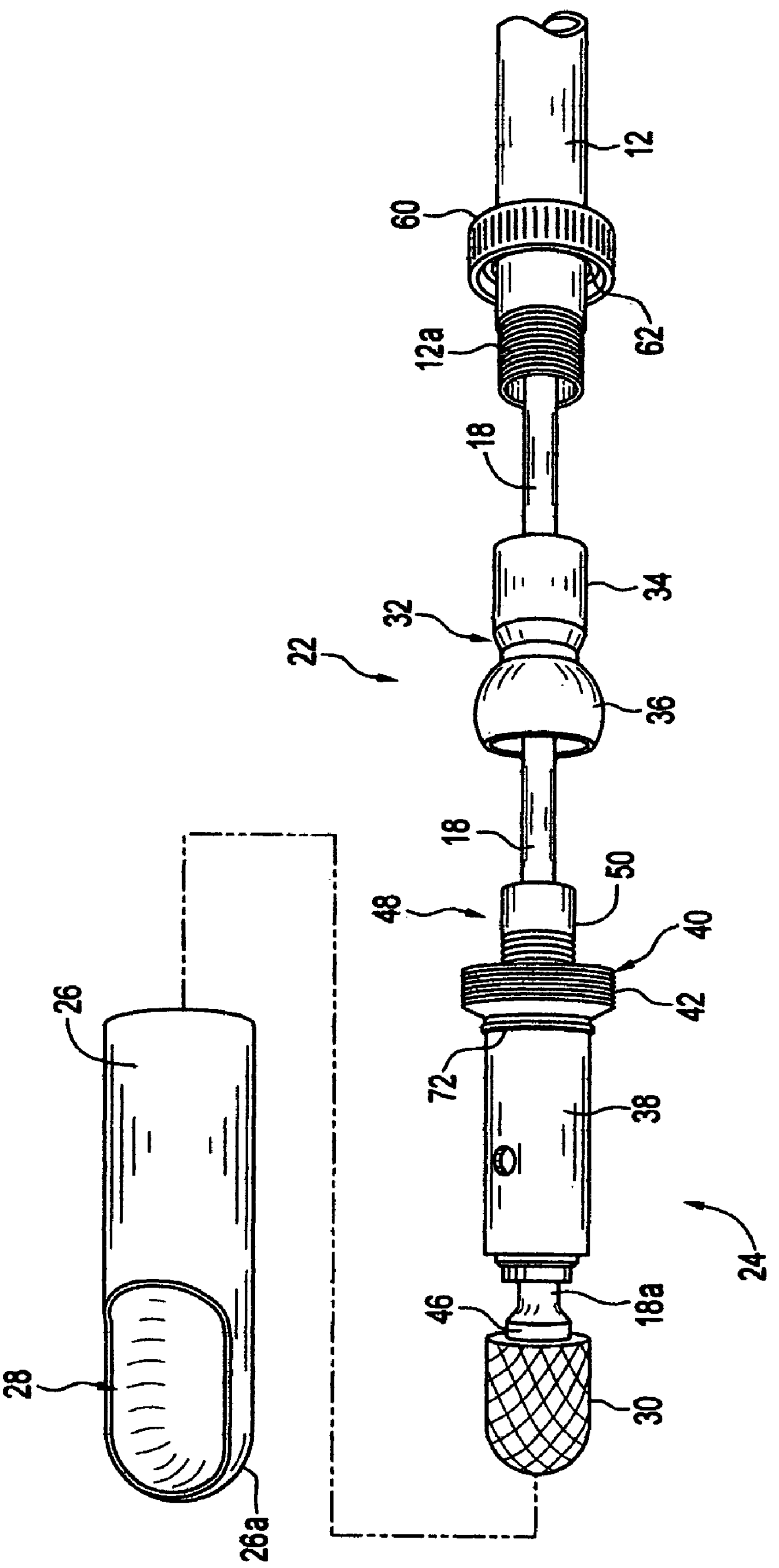
FIG. 2 is a perspective view of the float with portions partially disassembled and exploded for clarity.

Referring now to FIG. 2, extension 24 and knuckle 22 are shown partially disassembled, to reveal the structure in more detail. Arm 12 is a hollow tube with shaft 18 extending therethrough and supported on conventional sealed bearings. A separate drive unit will rotate shaft 18, which will then rotate bit 30 in extension 24. The forward end **12*a* of arm 12 is exteriorly threaded, and will receive the rearward end of knuckle base 32. Knuckle base 32 includes a rearwardly extending collar 34 having an outer diameter the same as arm 12, and interiorly threaded to engage the threads on arm forward end 12*a*. Thus, collar 34 will extend forwardly flush with arm 12 when attached to the forward end of arm 12**.

A hollow spherical ball 36 is mounted on the forward end of collar 34 and has a truncated forward end **36*a* from which shaft 18 projects. Collar 34 and/or ball 36 preferably have a bearing race (not shown) mounted therein, to receive shaft 18** and permit the rotation of the shaft with little friction.

Extension 24 includes a short tube 38 with bearing races (not shown) in the forward and rearward ends to rotatably support a short collet shaft 18*a* therethrough. The rearward end 38*b* of extension tube 38 has an enlarged bell 40 formed thereon, with threads 42 formed on the exterior surface. The interior surface 44 of bell 40 is spherical in shape, as shown in FIG. 4, with a diameter to snugly but slidably receive ball 36 of knuckle base 32, such that extension tube 38 will smoothly pivot about ball 36 (see FIGS. 2 and 3).

A collet 46 is mounted on the forward end of collet shaft 18*a* (shown in FIG. 4) and will selectively retain the shank of bit 30 therein in a conventional manner, thereby permitting simple replacement of bit 30, as needed. It should be noted that any method for removably mounting bit 30 on collet shaft 18*a* is within the scope of the invention, and the inventor does not intend to rely solely on the use of a collet to accomplish this goal.

The rearward end of collet shaft 18*a* (shown in FIG. 4) is mounted to a swivel device 48, which is mounted to the forward end of shaft 18, as shown in FIG. 2. Swivel device 48 may be of various forms, such as a universal joint, or a helical coupler 50 as specifically shown in FIGS. 2 and 4. Swivel device 48 transmits the rotational movement of shaft 18 to collet shaft 18*a*, while permitting pivotal movement of collet shaft 18*a* at swivel device 48.

Figure 4:
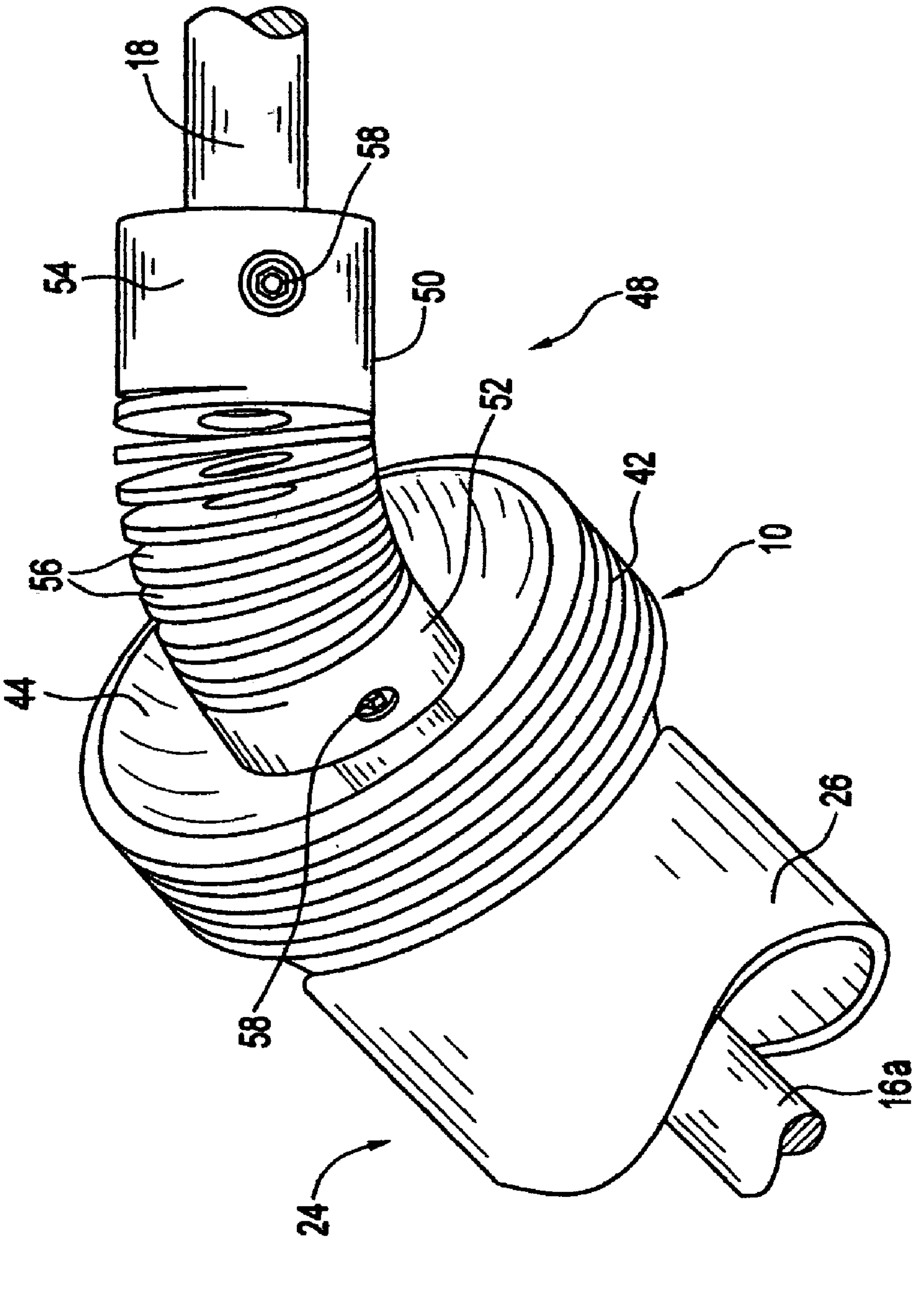
FIG. 4 is a super-enlarged perspective view of the pivoting knuckle of the float.

Referring now to FIG. 4, swivel device 48 is shown in more detail. In the preferred embodiment of the invention swivel device 48 is a helical coupler 50 having a head end 52 and a foot end 54 connected together by a helical coil 56. Head end 52 and foot end 54 are connected to their respective shafts 18*a* and 18, respectively, with a roll pin 58, to permit disassembly as required. As shown in FIG. 2, helical coupler 50 is enclosed within ball 36, to permit pivotal rotational movement of the coupler.

Figure 3:
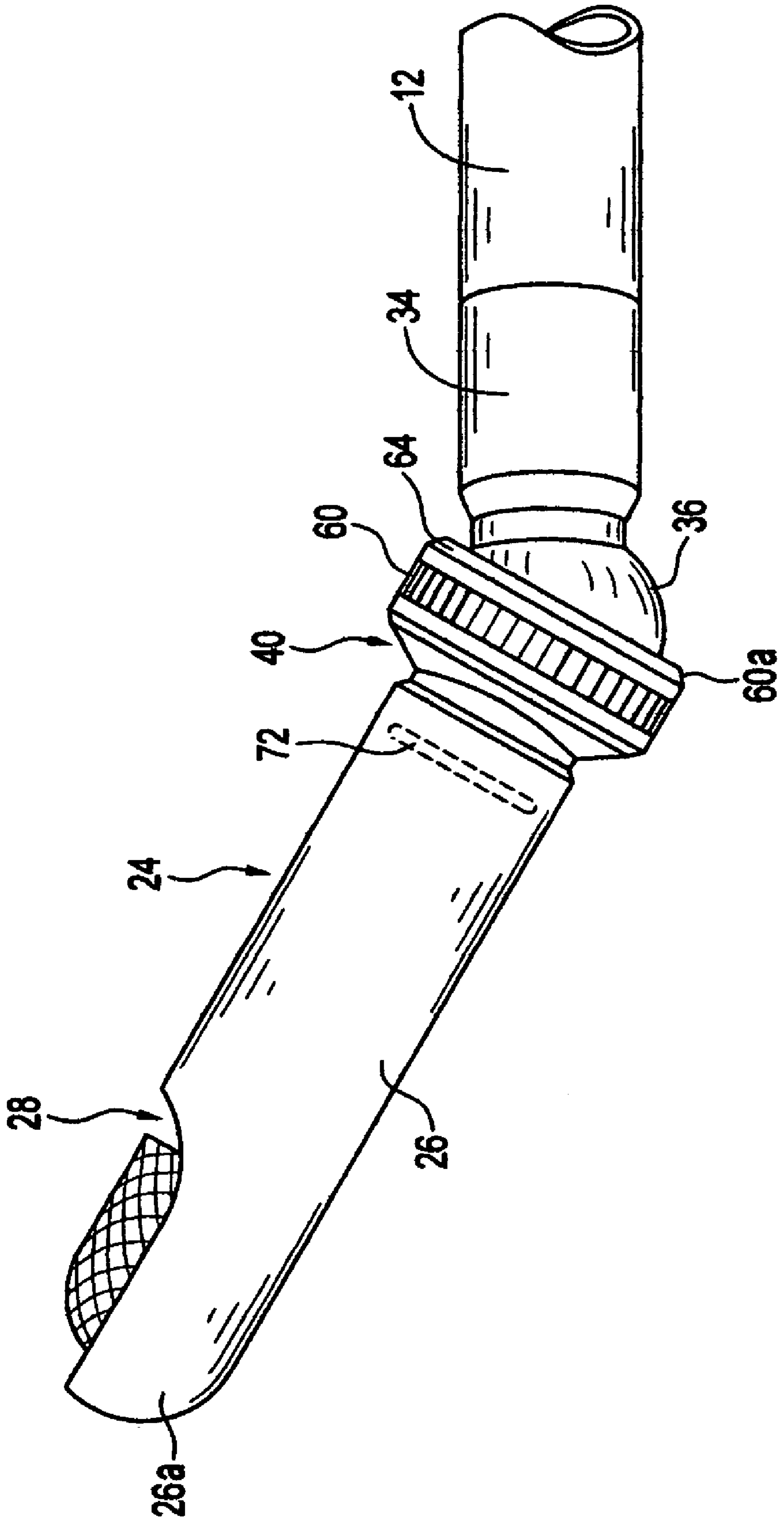
FIG. 3 is an enlarged side elevational view of the forward end of the float of FIG. 1.

Referring once again to FIG. 2, a securement collar 60 is provided with interior threads 62 to engage the exterior threads 42 of bell 40. The rearward end 60*b* of collar 60 is provided with an annular lip 64 directed radially inwardly to an inner diameter less than the outer diameter of ball 36, to thereby retain ball 36 within bell 40 when collar 60 is secured to bell 40, as shown in FIGS. 1 and 3.

Referring now to FIG. 1, handle 16 is attached to housing 14 to permit a user to more easily grip and control float 10. In the preferred embodiment an electrical cord 66 extends from handle 16 and is electrically connected at one end to variable speed trigger 68, and at the other end to a drive unit (not shown) for driving shaft 18. Trigger 68 permits the user to selectively operate the drive unit and thus the rotation of shaft 18. However, operation of the drive unit may also be accomplished in any other conventional fashion. For example, many rotary tools provide foot-operated pedals to operate the drive unit. In addition, the drive unit can be simply turned on and off, to provide constant power to the shaft 18.

Referring again to FIG. 2, cap 26 has an inner diameter slightly greater than the outer diameter of bit 30 and extension tube 38, to permit the cap rearward end 26*b* to slide over bit 30 and extension tube 38 and receive them within cap 26. A resilient, compressible O-ring 72 is mounted around the exterior perimeter of extension tube 38, proximal to bell 40, and has an outer diameter slightly greater than the inner diameter of cap 26. In this way cap 26 is selectively secured in position over the bit 30 and extension tube 38 by the frictional engagement of O-ring 72 with the interior surface of the rearward end 26*b* of cap 26. This friction fit also permits the cap to be rotated so that opening 28 in the forward end 26*a* of cap 26 is directed in the desired position relative to the handle 14 (see FIG. 1).

In operation, a bit 30 is mounted in collet 46 for rotation with collet shaft 18*a*, as shown in FIGS. 2 and 4. Bit 30 may be of any desired type and various styles are used in the filed of rotational grinding tools. Cap 26 is then slid over bit 30 and extension tube 38 and frictionally engaged upon O-ring 72.

Once ready for operation, float 10 is connected to a conventional drive unit by connecting drive shaft 18 to the drive shaft of the drive unit at coupler 20. In the preferred embodiment of the invention, electrical cord 20 is connected to a junction box, which interconnects a power source with trigger 68 and the drive unit. Trigger 68 is then depressed to operate the drive unit and cause shaft 18, extension shaft 18*a* and bit 30 to rotate at the desired velocity. In other versions of the invention, handle 16 and/or trigger 68 may not be used. In those embodiments, the drive unit is operated in its usual manner to rotate drive shaft 18 and bit 30.

In order to reach selected teeth within a horse's mouth, extension 24 may be pivoted on ball 36, as shown in FIG. 3. Preferably, pivotal movement within an arc of about 30° from the longitudinal axis of arm 12 and shaft 18 is sufficient to provide maneuverability and flexibility in the confined space of a horse's mouth. In addition, cap 26 may be rotated about the longitudinal axis of collet shaft 18*a*, and frictionally held in position by O-ring 72, to direct opening 28 in the forward end 26*a* of cap in the desired orientation. Because of the use of swivel device 48 (see FIGS. 2 and 4), bit 30 will continue to rotate at the desired speed throughout the pivoting of extension 24.

Block 12 includes a flat top surface 14 (shown in FIG. 2), a flat bottom surface 16, and a perimeter sidewall 18. Although the block 12 is shown generally square in shape, it should be understood that the shape of the perimeter wall is not required to be square, or even rectangular, to function as desired.

Whereas the invention has been shown and described in connection with the preferred embodiments thereof, many modifications, substitutions and additions may be made which are within the intended broad scope of the appended claims.

What is claimed is:

1. A rotary float, comprising:

an elongated tubular arm having a drive shaft rotatably mounted therethrough and projecting from opposing forward and rearward ends thereof;

a coupler on a rearward end of the drive shaft, for selectively and removably coupling a drive unit to the drive shaft, to thereby selectively rotate the drive shaft within the arm;

a bit connected to a forward end of the drive shaft for rotation therewith;

an elongated tubular cap removably secured over the bit to the forward end of the tubular arm, said cap having an opening with dimensions to reveal a sufficient portion of the bit to permit the bit to contact and engage a surface adjacent the cap;

means for removably securing said cap on said tubular arm, said means for removably securing the cap adapted to permit selective rotation of the cap completely about a longitudinal axis of the bit; and said means for removably securing the cap includes means for frictionally securing said cap in position on said tubular arm;

said means for frictionally securing said cap including a resilient, compressible O-ring mounted around a circumference of the tubular arm, the O-ring having an overall outer diameter greater than an inner diameter of the cap.

2. A rotary float, comprising:

an elongated tubular arm having a drive shaft rotatable mounted therethrough and projecting from opposing forward and rearward ends thereof;

a coupler on a rearward end of the drive shaft, for selectively and removably coupling a drive unit to the drive shaft, to thereby selectively rotate the drive shaft within the arm;

a collet shaft connected at a rearward end to a forward end of the drive shaft, for rotation therewith;

a bit mounted on a forward end of the collet shaft;

an elongated tubular cap removably secured over the bit and collet shaft on the forward end of the tubular arm, said cap having forward and rearward ends and an opening proximal the forward end, the opening having dimensions to reveal a sufficient portion of the bit to permit the bit to contact and engage a surface adjacent the cap; and means for removably, frictionally securing said cap on said tubular arm and permitting selective rotation of the cap about a longitudinal axis of the bit;

said means for frictionally securing said cap including a resilient, compressible O-ring mounted around a circumference of the tubular arm, the O-ring having an overall outer diameter greater than an inner diameter of the cap.

3. A rotary float, comprising:

an elongated tubular arm having a drive shaft rotatable mounted therethrough and projecting from opposing forward and rearward ends thereof;

a collet shaft connected at a rearward end to a forward end of the drive shaft, for rotation therewith;

said collet shaft rotatable mounted through an extension tube and projecting from a forward end of the extension tube;

a bit mounted on a forward end of the collet shaft;

an elongated tubular cap removably secured over the bit and extension tube, said cap having forward and rearward ends and an opening formed in a side proximal the forward end, the opening having dimensions to reveal a sufficient portion of the bit to permit the bit to contact and engage a surface adjacent the extension tube; and means for removably, frictionally securing said cap on said extension tube, said means permitting selective rotation of the cap completely about a longitudinal axis of the extension tube;

said means for frictionally securing said cap including a resilient, compressible O-ring mounted around a circumference of the extension tube, the O-ring having an overall outer diameter greater than an inner diameter of the cap.

* * * * *